United States Patent
Chang et al.

(10) Patent No.: US 10,282,294 B2
(45) Date of Patent: May 7, 2019

(54) MITIGATING DRAM CACHE METADATA ACCESS OVERHEAD WITH SRAM METADATA CACHE AND BLOOM FILTER

(71) Applicant: Samsung Electronics Co., Ltd., Suwon-si, Gyeonggi-do (KR)

(72) Inventors: Mu-Tien Chang, Santa Clara, CA (US); Dimin Niu, Sunnyvale, CA (US); Hongzhong Zheng, Los Gatos, CA (US)

(73) Assignee: Samsung Electronics Co., Ltd. (KR)

( * ) Notice: Subject to any disclaimer, the term of this patent is extended or adjusted under 35 U.S.C. 154(b) by 38 days.

(21) Appl. No.: 15/587,286

(22) Filed: May 4, 2017

(65) Prior Publication Data

US 2018/0232310 A1    Aug. 16, 2018

Related U.S. Application Data

(60) Provisional application No. 62/459,414, filed on Feb. 15, 2017.

(51) Int. Cl.
  G06F 12/08      (2016.01)
  G06F 12/0817    (2016.01)
  G06F 12/0864    (2016.01)

(52) U.S. Cl.
  CPC ...... *G06F 12/0822* (2013.01); *G06F 12/0864* (2013.01); *G06F 2212/62* (2013.01)

(58) Field of Classification Search
  CPC ............. G06F 12/0822; G06F 12/0864; G06F 2212/62
  See application file for complete search history.

(56) References Cited

U.S. PATENT DOCUMENTS 6,920,477 B2 *   7/2005   Mitzenmacher .... H04L 67/2852
                                                707/999.101
8,478,934 B2     7/2013   Zwisler
                          (Continued)

OTHER PUBLICATIONS

Alcorn, Paul, "Samsung Partners With Netlist, Fires its First NVDIMM Shot at 3D XPoint," Nov. 20, 2015 (downloaded from http://www.tomsitpro.com/articles/samsung-netlist-3d-xpoint-nvdimm, 1-3048.html on Aug. 22, 2018), 5 pages.*

*Primary Examiner* — Glenn Gossage
(74) *Attorney, Agent, or Firm* — Innovation Counsel LLP (57) ABSTRACT

A system and method for mitigating overhead for accessing metadata for a cache in a hybrid memory module are disclosed. The method includes: providing a hybrid memory module including a DRAM cache, a flash memory, and an SRAM for storing a metadata cache; obtaining a host address including a DRAM cache tag and a DRAM cache index; and obtaining a metadata address from the DRAM cache index, wherein the metadata address includes a metadata cache tag and a metadata cache index. The method further includes determining a metadata cache hit based on a presence of a matching metadata cache entry in the metadata cache stored in the SRAM; in a case of a metadata cache hit, obtaining a cached copy of data included in the DRAM cache and skipping access to metadata included in the DRAM cache; and returning the data obtained from the DRAM cache to a host computer. The SRAM may further store a Bloom filter, and a potential DRAM cache hit may be determined based on a result of a Bloom filter test. A cache controller of the hybrid memory module may disable the Bloom filter when a metadata cache hit ratio is higher than a threshold.

20 Claims, 5 Drawing Sheets

(56) References Cited

U.S. PATENT DOCUMENTS

| | | | |
|---|---|---|---|
| 8,868,843 B2 | 10/2014 | Loh | |
| 9,389,965 B1 | 7/2016 | Douglis et al. | |
| 9,436,596 B2 | 9/2016 | Sengupta et al. | |
| 9,524,235 B1 | 12/2016 | Sprouse | |
| 2008/0155229 A1* | 6/2008 | Beyer | G06F 17/10 711/216 |
| 2013/0173853 A1 | 7/2013 | Ungureanu et al. | |
| 2013/0290607 A1* | 10/2013 | Chang | G06F 12/0895 711/103 |
| 2014/0289467 A1* | 9/2014 | Svendsen | G06F 12/0895 711/118 |
| 2016/0188623 A1 | 6/2016 | Finlay et al. | |
| 2016/0246726 A1* | 8/2016 | Hahn | G06F 12/0862 |
| 2016/0266795 A1 | 9/2016 | Woo et al. | |

* cited by examiner

MITIGATING DRAM CACHE METADATA ACCESS OVERHEAD WITH SRAM METADATA CACHE AND BLOOM FILTER

CROSS-REFERENCE TO RELATED APPLICATION(S)

This application claims the benefits of and priority to U.S. Provisional Patent Application Ser. No. 62/459,414 filed Feb. 15, 2017, the disclosure of which is incorporated herein by reference in its entirety.

TECHNICAL FIELD

The present disclosure relates generally to hybrid memory modules, more particularly, to a system and method for mitigating an overhead for accessing metadata for a DRAM cache in a hybrid memory module using an SRAM metadata cache and a Bloom filter.

BACKGROUND

A hybrid memory module refers to a memory module that contains both a volatile memory (e.g., a dynamic random-access memory (DRAM)) and a non-volatile memory (e.g., a flash memory) as a primary data storage device. An example of the hybrid memory module is a hybrid dual in-line memory module (DIMM) integrating a DRAM and a flash memory. In a typical configuration, the DRAM can be used as a cache memory for the data stored in the flash memory. To achieve a fast access to the DRAM cache, the metadata of the DRAM cache can be stored in a static random-access memory (SRAM) of the hybrid memory module.

However, the required storage size for the metadata of the DRAM cache may be bigger than the available size of the SRAM. The storage capacity of the SRAM integrated in the hybrid DIMM may be kept relatively small due to its cost. Due to the limited storage size of the SRAM, the entire metadata for the DRAM cache may not fit in the SRAM, and resultantly the remaining portion of the metadata that does not fit in the SRAM must be stored in the DRAM. In this case, the slow access speed to the metadata stored in the DRAM may result in a performance drop when accessing data.

To remedy this issue, several approaches have been proposed. A first approach is to reduce the size of the metadata stored in the SRAM. For example, the size of the metadata may be reduced by reducing a number of cache lines stored in the SRAM. In this case, the size of each cache line is increased. The reduced size of the cache lines may negatively impact hit rates and require reading multiple pages from the flash memory in cases of a cache miss. In another example, cache associativity may be reduced by reducing tag bits and replacement bits, but this approach may also negatively impact hit rates. In yet another example, a replacement policy may be implemented as so not to require replacement bits.

However, test results show that the combination of these effects for reducing the metadata size can achieve reduction of only a fraction the required metadata size. Therefore, the issue of limited size of the SRAM for storing the metadata may still persist as the data storage capacity of the flash memory and the size of the DRAM cache increase.

SUMMARY

According to one embodiment, a method includes: providing a hybrid memory module including a dynamic random-access memory (DRAM) cache, a flash memory, and a static random-access memory (SRAM) for storing a metadata cache, wherein the DRAM cache includes a cached copy of data stored in the flash memory and metadata corresponding to the cached copy of data, and wherein the metadata cache includes a cached copy of a portion of the metadata included in the DRAM cache; receiving from a host computer a data access request for a data stored in the hybrid memory module; obtaining a host address by decoding the data access request, wherein the host address includes a DRAM cache tag and a DRAM cache index; obtaining a metadata address from the DRAM cache index, wherein the metadata address includes a metadata cache tag and a metadata cache index; determining a metadata cache hit based on a presence of a matching metadata cache entry in the metadata cache stored in the SRAM, wherein the matching metadata cache entry has a pair of a metadata cache tag and a DRAM cache tag; in a case of a metadata cache hit, obtaining the cached copy of data included in the DRAM cache and skipping access to the metadata included in the DRAM cache; and returning the data obtained from the DRAM cache to the host computer.

According to another embodiment, a hybrid memory module includes: a flash memory; a dynamic random-access memory (DRAM) cache, wherein the DRAM cache includes a cached copy of data stored in the flash memory and metadata corresponding to the cached copy of data; a static random-access memory (SRAM) for storing a metadata cache including a cached copy of a portion of the metadata included in the DRAM cache; a memory interface for providing an interface to a host computer; a memory access controller for accessing data stored in the DRAM cache and the flash memory; a DRAM controller for controlling access to the DRAM cache; a flash controller for controlling access to the flash memory; and a cache controller for determining a presence of a cached copy of a requested data from the host computer.

The cache controller is configured to: obtain a host address by decoding the data access request, wherein the host address includes a DRAM cache tag and a DRAM cache index; obtain a metadata address from the DRAM cache index, wherein the metadata address includes a metadata cache tag and a metadata cache index; determine a metadata cache hit based on a presence of a matching metadata cache entry in the metadata cache stored in the SRAM, wherein the matching metadata cache entry has a pair of a metadata cache tag and a DRAM cache tag; and in a case of a metadata cache hit, instruct the DRAM controller to obtain the cached copy of data included in the DRAM cache, skipping access to metadata included in the DRAM cache. The memory access controller is configured to return the data obtained from the DRAM cache to the host computer.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for mitigating an overhead for accessing metadata for a DRAM cache in a hybrid memory module using an SRAM metadata cache and a Bloom filter. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure describes various techniques for reducing accesses to a DRAM metadata. For example, the DRAM metadata accesses can be reduced by using a random replacement policy. In this case, no replacement bits may be needed, but the performance may be adversely affected. In another example, the DRAM metadata accesses can be reduced by storing partial DRAM cache metadata in an SRAM. In this case, only SRAM matches would trigger DRAM searches. However, the partial metadata approach can have an inferior performance when metadata matches occur frequently. An alternative approach is to use SRAM to cache metadata itself and use a Bloom filter to efficiently filter out DRAM cache misses and perform a DRAM search only when tags match. However, the Bloom filter can trigger false positives, and the use of a Bloom filter in the SRAM may be generally inefficient because of the inferior performance of the DRAM cache.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for mitigating an overhead for accessing DRAM cache metadata in a hybrid memory module using an SRAM metadata cache and a Bloom filter. According to one embodiment, the Bloom filter and the SRAM cache are combined to store metadata for the DRAM cache. The combined use of the Bloom filter and the SRAM cache would compensate for the weaknesses of each and provide an improved performance to access data stored in the hybrid memory module. In general, a Bloom filter favors cache misses, and a metadata cache favors cache hits. If both the metadata cache and the Bloom filter are accessed in parallel, a Bloom filter FALSE implies a cache miss, so no DRAM access is needed. An SRAM metadata cache hit is considered as a fast cache hit, so no DRAM metadata access is needed.

Figure 1:
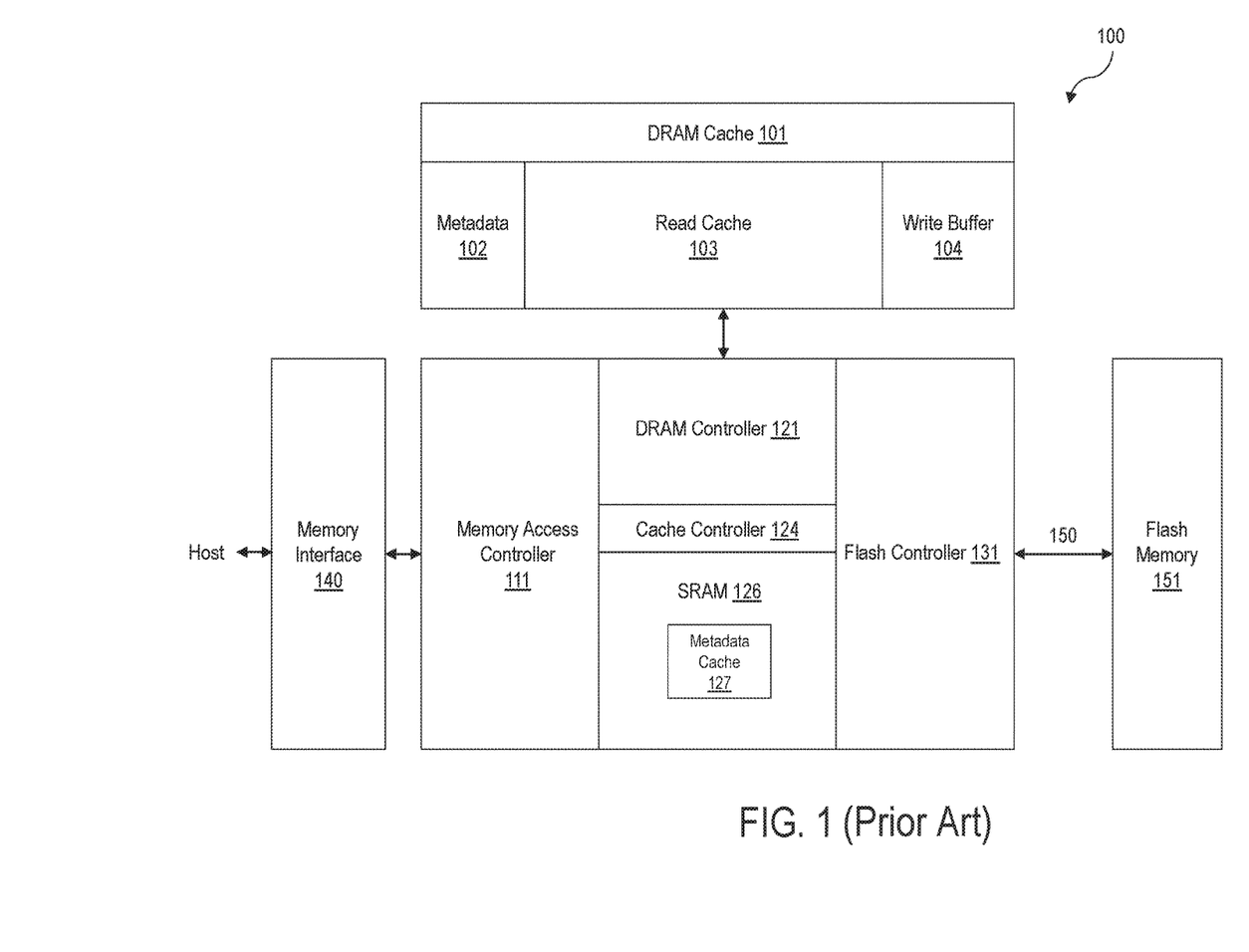
FIG. 1 shows an architecture of a conventional hybrid memory module.

FIG. 1 shows an architecture of a conventional hybrid memory module. The hybrid memory module 100 includes a DRAM cache 101, a flash memory 151, a memory access controller 111, a DRAM controller 121, a cache controller 124, an SRAM 126 for storing metadata for the metadata cache 127, and a flash controller 131. The metadata cache 127 includes a cached version of the metadata 102 of the DRAM cache 101. The DRAM cache 101 stores cache data for the flash memory 151 and includes metadata 102, a read cache 103, and a write buffer 104. The metadata 102 can include a tag, valid bits, dirty bits, etc. It is noted that the terms, metadata and tag, can be interchangeably used herein unless explicitly stated otherwise. The read cache 103 stores cached data stored in the flash memory 151. The read cache 103 is used to cache data. The read cache 103 can reduce the number of memory accesses to the flash memory 151. Data to be written to the flash memory 151 can be buffered in the write buffer 104. The write buffer 104 can reduce the write traffic to the flash memory 151.

A host computer (not shown) sends a memory access request to access data stored in the hybrid memory module 100 via a memory interface 140 according to the memory host/slave interface protocol (e.g., nonvolatile dual inline memory module-P, or NVDIMM-P) established between the host computer and the hybrid memory module 100. The memory access request is forwarded to the memory access controller 111. The memory access controller 111 acts as an intermediate translator and translates requests from the host (via NVDIMM-P protocol) to a format that is readable by the hybrid memory module 100. After translating the requests from the host, the memory access controller 111 forwards the translated information to the cache controller 124.

The cache controller 124 checks the metadata cache 127 stored in the SRAM 126 and determines a metadata cache hit or miss. If it is a metadata cache hit, the cache controller 124 confirms that the requested data is stored in the DRAM cache 101 and requests the DRAM controller 121 to access the requested data in the DRAM cache 101 using the metadata stored in the metadata cache 127 without accessing the metadata 102 in the DRAM cache 101. If it is a metadata cache miss, the cache controller 124 requests the DRAM controller 121 to access the metadata 102 stored in the DRAM cache 101 and determine a DRAM cache hit or miss. After checking the DRAM cache hit or miss, the cache controller 124 can determine the exact destination of the requested data. If it is a DRAM cache hit, the cache controller 124 requests the DRAM controller 121 to access the requested data stored in the DRAM cache 101. If it is a DRAM cache miss, the cache controller 124 requests the flash controller 131 to access the requested data stored in the flash memory 151.

When the cache controller 124 determines that the requested data is stored in the DRAM cache 101, the cache controller 124 instructs the DRAM controller 121 to access the DRAM cache 101 by referring to the metadata cache 127 stored in the SRAM 126 in cases of a metadata cache hit or by referring to the metadata 102 in cases of a DRAM cache hit. When the cache controller 124 determines that the requested data is stored in the flash memory 151, the flash controller 131 accesses and retrieves the data stored in the flash memory 151 via flash streams 150.

Figure 2:
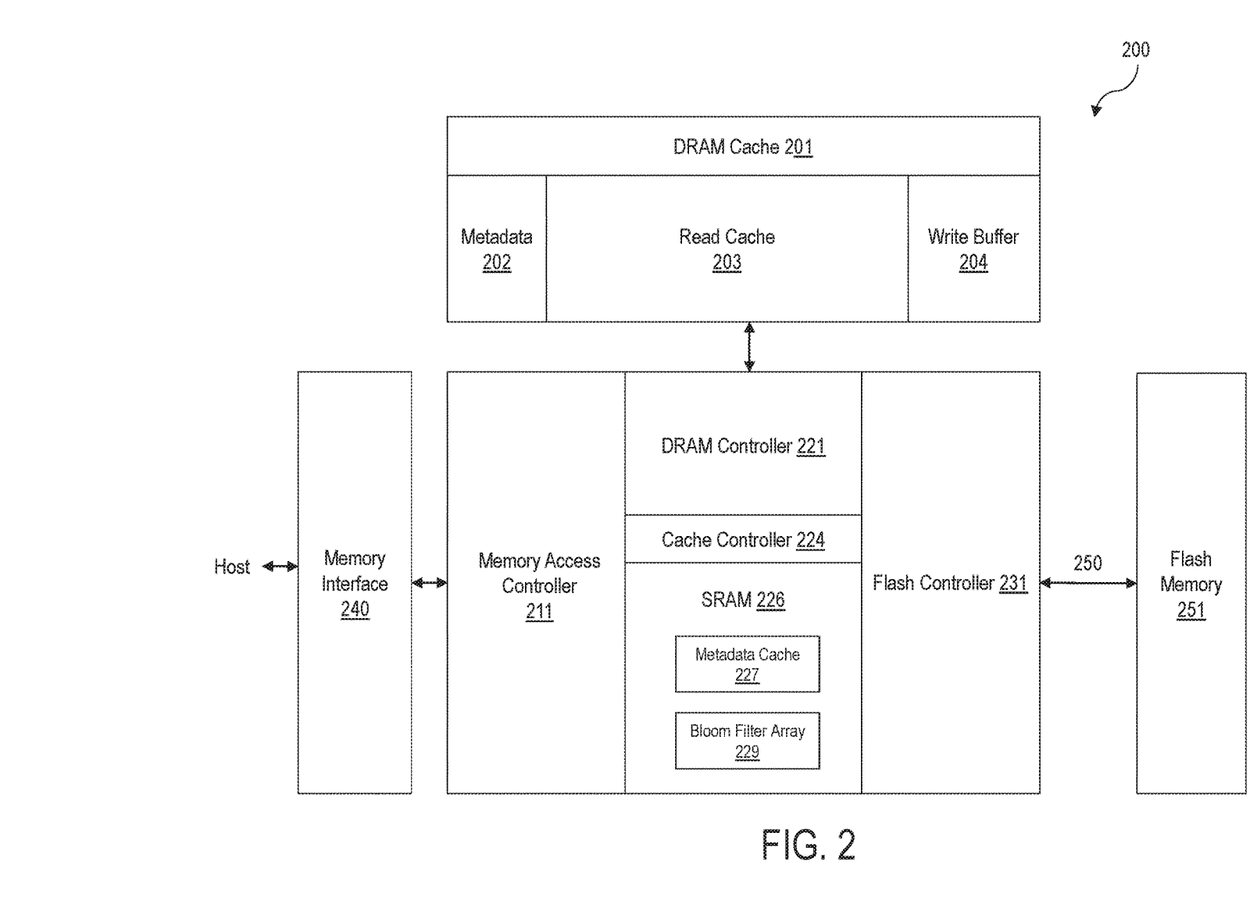
FIG. 2 shows an architecture of an example hybrid memory module, according to one embodiment.

FIG. 2 shows an architecture of an example hybrid memory module, according to one embodiment. The hybrid memory module 200 includes a DRAM cache 201, a flash memory 251, a memory access controller 211, a DRAM controller 221, a cache controller 224, an SRAM 226, and a flash controller 231.

The SRAM 226 stores a cached copy of the metadata 202 of the DRAM cache 201 in the metadata cache 227. Depending on the available size of the metadata cache 227, the cached copy of the metadata 202 stored in the metadata cache 227 can be a subset of the metadata 202. The SRAM 226 further stores another "set" of cached metadata (either the complete set of the metadata 202 or a subset of the metadata 202) in the form of a Bloom filter array 229.

The metadata cache 227 includes a cached version of the metadata 202 of the DRAM cache 201. The DRAM cache 201 stores cache data for the flash memory 251 and includes a metadata 202, a read cache 203, and a write buffer 204. The metadata 202 can include a tag, valid bits, dirty bits, etc. It is noted that the terms, metadata and tag, can be interchangeably used herein unless explicitly stated otherwise. The read cache 203 stores cached data from the flash memory 251. The read cache 203 is used to cache data. The read cache 203 can reduce the number of memory accesses to the flash memory 251. Data to be written to the flash memory 251 can be buffered in the write buffer 204. The write buffer 204 can reduce the write traffic to the flash memory 251.

A host computer (not shown) sends a memory access request to access data stored in the hybrid memory module 200 via a memory interface 240 according to the memory host/slave interface protocol (e.g., NVDIMM-P) established between the host computer and the hybrid memory module 200. The memory access request is forwarded to the memory access controller 211. The memory access controller 211 acts as an intermediate translator and translates requests from the host (via NVDIMM-P protocol) to a format that is readable by the hybrid memory module 200. After translating the requests from the host, the memory access controller 211 forwards the translated information to the cache controller 224.

The cache controller 224 checks the metadata about the cache 227 stored in the SRAM 226 and determines a metadata cache hit or miss. If it is a metadata cache hit, the cache controller 224 confirms that the requested data is stored in the DRAM cache 201 and requests the DRAM controller 221 to access the requested data in the DRAM cache 201 using the metadata stored in the metadata cache 227 without accessing the metadata 202 in the DRAM cache 201.

According to one embodiment, the cache controller 224 provides various functions to operate on the metadata stored in the SRAM 226. Examples of such functions include, but are not limited to, an insert function and a test function that manage the metadata stored in the SRAM 226. The Bloom filter can operate on the Bloom filter array 229 stored in the SRAM 226 using these functions to determine if there is a DRAM cache hit or miss. For example, the cache controller 224 performs a Bloom filter test function on a Bloom filter array. If the Bloom filter test result is negative, it means a DRAM cache miss, indicating that the data is not stored in the DRAM cache 201, and the cache controller 224 sends a request to the flash controller 231 to obtain the data without accessing the metadata 202 of the DRAM cache 201. According to one embodiment, the metadata cache check on the metadata cache 227 and the Bloom filter test on the Bloom filter can be performed independently, simultaneously, or in a particular sequence.

If it is a metadata cache miss and the test result of the Bloom filter is positive (i.e., indicating a DRAM cache hit, but it can be a false positive), the cache controller 224 requests the DRAM controller 221 to access the metadata 202 of the DRAM cache 201 to determine if it is indeed a DRAM cache hit or miss. Based on a presence of matching metadata in the metadata 202 of the DRAM cache 201, the cache controller 224 can determine the exact destination of the requested data. If it is a DRAM cache hit, the cache controller 224 requests the DRAM controller 221 to access the requested data stored in the DRAM cache 201. If it is a DRAM cache miss, the cache controller 224 requests the flash controller 231 to access the requested data stored in the flash memory 251.

Referring to FIG. 2, the metadata cache 227 and Bloom filter array 229 may have independent data structures and can store the same or different metadata. The metadata cache 227 and the Bloom filter array 229 are independent of each other, having their own dedicated regions in the SRAM 226 to store their own metadata and logic to operate on the metadata. According to one embodiment, the SRAM 226 includes only one of the metadata cache 227 and the Bloom filter array 229, or the cache controller 224 operates only one of the metadata cache 227 and the Bloom filter array 229. Irrespective of the presence or operation of the Bloom filter array 229, the metadata cache 227 can operate in the same manner. Similarly, the Bloom filter array 229 operates in the same manner irrespective of the presence or operation of the metadata cache 227. Depending on the mode of operation and the presence (or absence) of the metadata cache 227, the allocated region of the metadata cache 227 and the Bloom filter array 229 in the SRAM 226 may dynamically change. The present hybrid memory module 200 provides one or more "wrapper" functions for the metadata cache 227 and the Bloom filter array 229 to facilitate the determination of a cache hit or miss without necessarily relying on each other.

In a case of a metadata cache hit, i.e., if the metadata cache 227 in the SRAM 226 stores a cached copy of the metadata, the cache controller 224 determines that the requested data is stored in the DRAM cache 201, the cache controller 224 instructs the DRAM controller 221 to access the DRAM cache 201 by referring to the metadata cache 227 stored in the SRAM 226. In a case of a DRAM cache hit, the cache controller 224 instructs the DRAM controller 221 to access the DRAM cache 201 by referring to the metadata 202. When the cache controller 224 determines that the requested data is stored in the flash memory 251, the flash controller 231 accesses and retrieves the data stored in the flash memory 251 via flash streams 250.

According to one embodiment, the metadata cache 227 can be efficiently maintained because the DRAM metadata 202 is inclusive and is clean. For example, lines in the metadata cache 227 are also stored in the metadata 202 of the DRAM cache 201. Any access type to the metadata cache 227 is always perceived as a read access. Table 1 shows a list of actions performed by the cache controller 224 of the hybrid memory module 200 according access types and the location of the requested data.

TABLE 1

Data Access and Actions

| Access Type | In Metadata Cache? | In DRAM Cache? | Actions |
| --- | --- | --- | --- |
| Read | No | No | [Metadata cache miss, DRAM cache miss] Insert tag and data to DRAM cache Insert tag to metadata cache |
| Read | Yes | No | N/A because of inclusiveness |
| Read | No | Yes | [Metadata cache miss, DRAM cache hit] Insert tag to metadata cache |
| Read | Yes | Yes | [Metadata cache hit, DRAM cache hit] Do nothing |
| Write | No | No | [Metadata cache miss, DRAM cache miss] Insert tag and data to DRAM cache Insert tag to metadata cache |
| Write | Yes | No | N/A because of inclusiveness |
| Write | No | Yes | [Metadata cache miss, DRAM cache hit] Insert tag to metadata cache |
| Write | Yes | Yes | [Metadata cache hit, DRAM cache hit] Do nothing |

In the case of a read access request, the cache controller 224 can determine whether a cached copy of the requested data can be found in the DRAM cache 201 in the following manner. First, the cache controller 224 checks whether there is matching metadata in the metadata cache 227. If a match is found, due to the inclusiveness of the metadata tags and the DRAM cache tags, the cache controller 224 can conclude the read access request hits in the DRAM cache 201. The cache controller 224 can then request the targeted data from the DRAM cache 201 using the metadata that is hit in the metadata cache 227 but without accessing the DRAM metadata 202. In addition to the metadata cache check, the cache controller 224 can perform a DRAM cache hit or miss check using the Bloom filter array 229. In cases of a DRAM cache miss by the Bloom filter test, the cache controller 224 can conclude that the targeted data is not in the DRAM cache 201 and send a request to the flash controller 231 to obtain the data without accessing the metadata 202 of the DRAM cache 201. If the Bloom filter test result indicates a DRAM cache hit, the cache controller 224 cannot determine a true DRAM cache hit or miss at this stage because the DRAM cache hit by the Bloom filter can be a false positive. In this case, the cache controller 224 thus further requests the DRAM controller 221 to access the DRAM metadata 202 to determine a true DRAM cache hit or miss. By comparing the DRAM cache tag included in the data access request against the DRAM metadata 202, the cache controller 224 can precisely determine whether the data request hits in the DRAM cache 201 or not. If the DRAM cache hits, the cache controller 224 can request the targeted data from the DRAM cache 201. If the DRAM cache misses, the cache controller 224 can request the targeted data from the flash memory 251, insert the data obtained from the flash memory 251 to the DRAM cache 201, and update the DRAM metadata 202. Regardless of the DRAM cache hit or miss, since the metadata cache missed, the cache controller 224 can use the metadata obtained from the DRAM metadata 202 to update the metadata cache.

In the case of a write access request, the cache controller 224 can perform equivalent actions based on the matching results of the metadata cache and the DRAM cache as in the case of a read access request. The difference between read and write access operations will be highlighted in further detail below.

Figure 3:
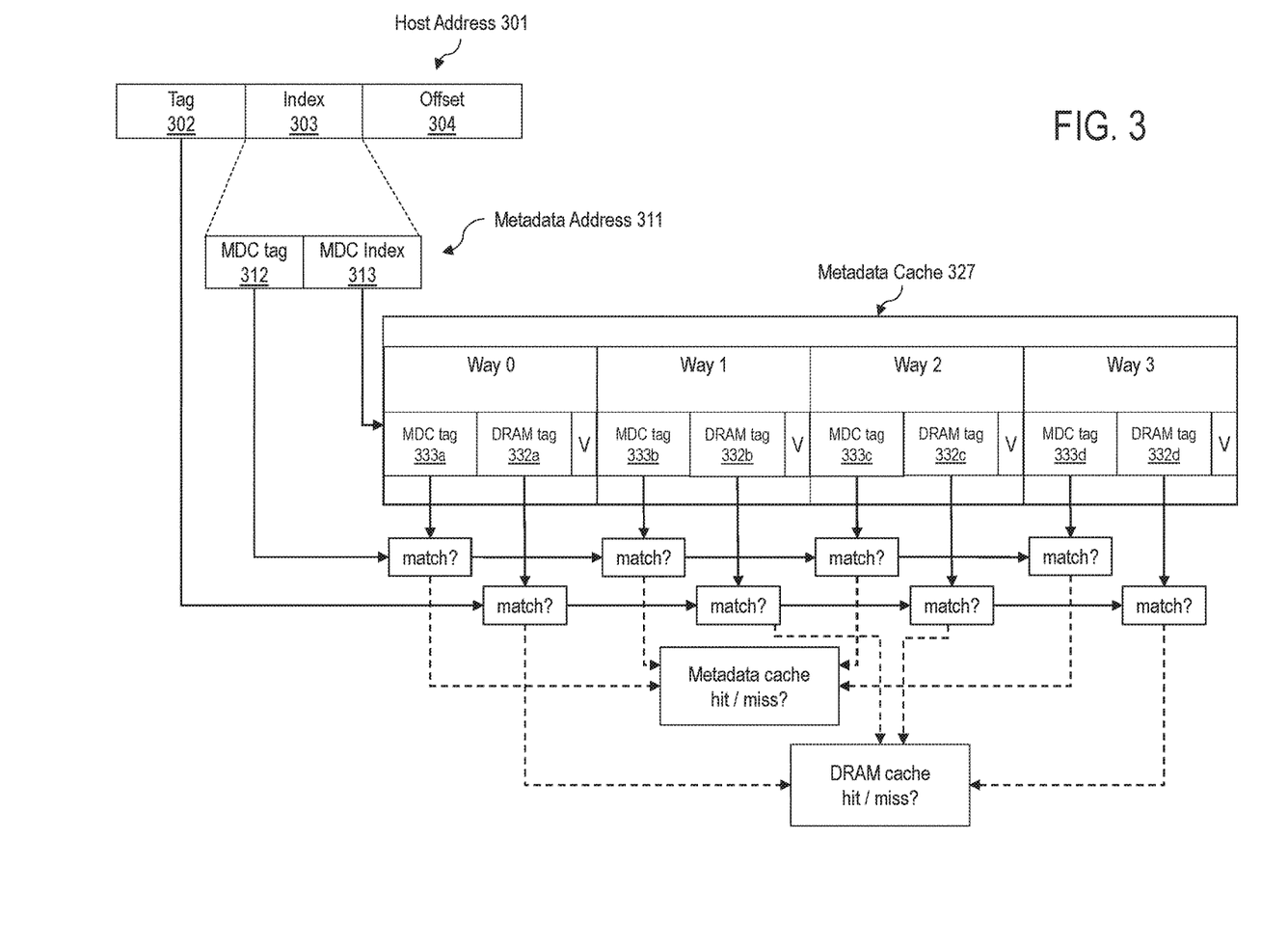
FIG. 3 shows a block diagram of an example cache controller operation, according to one embodiment.

FIG. 3 shows a block diagram of an example cache controller operation, according to one embodiment. The cache controller explained with reference to FIG. 3 can be the cache controller 224 integrated in the hybrid memory module 200 as shown in FIG. 2. In this case, duplicate explanations of the hybrid memory module 200 and the internal components, modules, and devices integrated in the hybrid memory module will be omitted.

In response to a data access request received from a host computer, the cache controller decodes the data access request to obtain a host address 301 of the requested data and identify an access type (e.g., read, write). The host address 301 includes a tag 302 (herein also referred to as a DRAM cache tag), an index 303 (herein also referred to as a DRAM cache index), and an offset 304.

According to one embodiment, a cache line in the DRAM cache can be larger than a size of the host-requested data. In this case, the offset 304 is used to determine a portion of the cache line corresponding to the requested data. For example, if a cache line is 2 kilobytes (2 KB), and the requested data size is 1 byte (1B), there are 2048 (2 KB/1B) pieces of data in the cache line requiring a total of 2048 offset numbers to uniquely identify a data piece that the host address is referring to. For example, the offset 304 being 0 refers to the first data piece in the cache line, and the offset 304 being 2047 refers to the last data piece in the cache line.

According to one embodiment, the index 303 can include metadata information associated with the DRAM cache. The cache controller can further decode the index 303 to obtain the metadata address 311 and compare the metadata address 311 against the metadata cache 327 stored in the SRAM to determine a metadata cache hit or miss. According to one embodiment, the metadata address 311 includes a metadata cache (MDC) tag 312 and a metadata cache (MDC) index 313.

First, the cache controller uses the MDC index 313 of the metadata address 311 to select a matching metadata entry among a plurality of DRAM cache metadata stored in the SRAM metadata cache 327. Each matching metadata entry stored in the SRAM metadata cache 327 can have a pair of tags including an MDC tag 333 (333*a*-333*d*), a DRAM cache tag 332 (332*a*-332*d*), and a valid bit V. The valid bit V indicates whether the associated cache line is valid or not. For example, a cache line with a matching metadata entry indicates a cache miss if V=0. If the SRAM metadata cache 327 is organized as multiple ways as shown in the example (e.g., way 0, way 1, way 2, and way 3), the MDC index 313 can correspond to a way ID.

To determine a metadata cache hit or miss, the cache controller searches for a matching entry in the metadata cache 327 and compares the MDC tag 312 of the metadata address 311 against the MDC tag 333 of the identified matching entry. If the MDC tag 312 and the MDC tag 333 match, the data including the original host tag is read from the matching entry. The original host tag stored in the metadata cache 327 is compared against the host tag 302 of the host address 301. If they match, the cache controller determines a metadata cache hit and accesses the requested data in the DRAM cache using the matching host tag stored in the metadata cache 327 without accessing the metadata included in the DRAM cache.

In addition to the metadata cache check, the cache controller can perform a Bloom filter test to determine a presence (or absence) of the cached data in the DRAM cache (i.e., a DRAM cache hit or miss) using a Bloom filter. The Bloom filter may be implemented in various forms, for example, via a comparator. The cache controller compares the tag 302 of the host address 301 against the DRAM cache tag 332 of the matching metadata pair that is identified by the metadata cache check. If the Bloom filter test indicates a DRAM cache miss (i.e., no tag 332 that matches the tag 302 of the host address 301 exists in the metadata cache 327), the cache controller can conclude that the targeted data is not present in the DRAM cache, and request the flash controller to access the data stored in the flash memory.

In some cases, the cache controller finds no matching metadata entry in the metadata cache 327 (i.e., a metadata cache miss), and the Bloom filter can indicate a DRAM cache hit. However, the indication of the DRAM cache hit by the Bloom filter can be a false positive, therefore the cache controller proceeds to access the metadata included in the DRAM cache to determine whether the targeted data is indeed stored in the DRAM cache (a true DRAM cache hit or miss). Based on the comparison result between the tag 302 of the host address 301 and the metadata included in the DRAM cache, the cache controller can precisely determine the location of the targeted data. If there is no matching metadata (i.e., a true DRAM cache miss) in the DRAM cache, the cache controller can guarantee that there is no cached copy of the requested data in the DRAM. In this case, the cache controller can directly access the flash controller to access the data stored in the flash memory, skipping accessing the DRAM cache. If there is matching metadata (i.e., a true DRAM cache hit) in the DRAM cache, the cache controller can access the DRAM controller to access the data stored in the DRAM cache.

Figure 4:
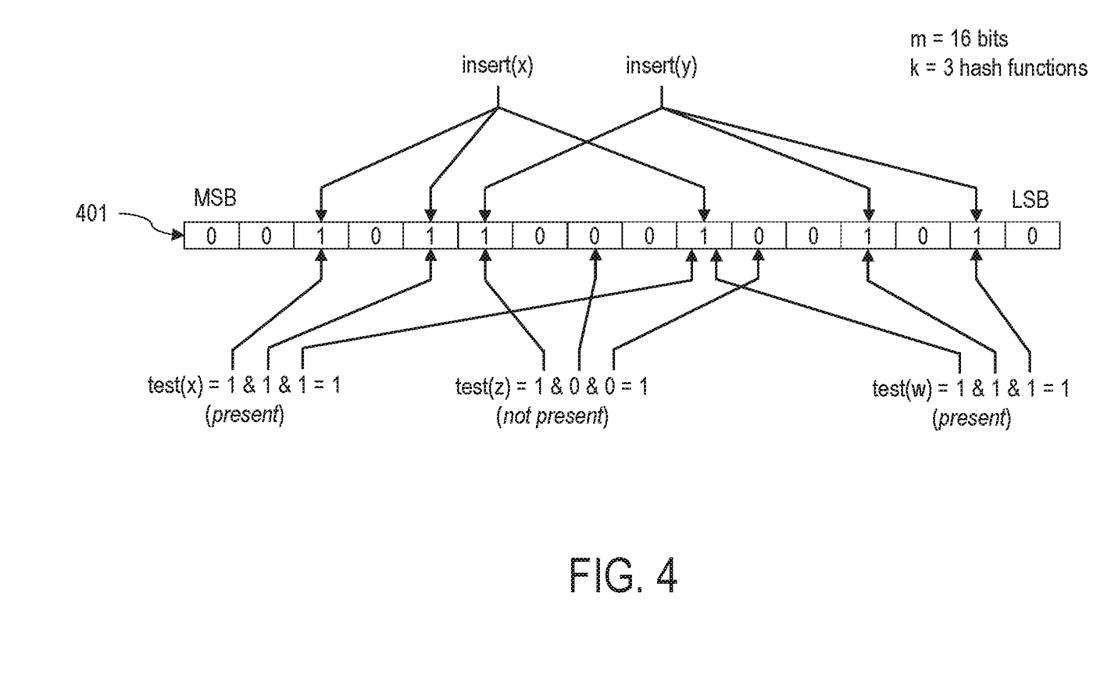
FIG. 4 shows an example Bloom filter implemented in a hybrid memory module, according to one embodiment.

FIG. 4 shows an example Bloom filter implemented in a hybrid memory module, according to one embodiment. The cache controller provides an insert function and a test function for the Bloom filter. According to one embodiment, the insert function is a hash function. The cache controller can employ more than one hash functions depending on the setting of the Bloom filter. For example, the inputs to the insert and test functions that are denoted as x, y, z, and w can be metadata cache tags.

The metadata of the Bloom filter stored in a dedicated region of the SRAM of the present hybrid memory module may be implemented as an array, herein also referred to as a Bloom filter array, including a plurality of entries. In the present example, each entry of the Bloom filter array is 16-bit, and there are three hash functions. The test function provides matching results for all of the three hash functions. It is noted that these are examples only, and a different length of the Bloom filter array and a different number of hash functions may be used without deviating from the scope of the present disclosure.

For a given cache tag (e.g., tag 302 in FIG. 3), the insert function inserts (or updates) bits into pointed entries of the Bloom filter array 401 according to a hash algorithm. In the present example, for the cache tag x, the hash function insert sets the entries (bits 7, 12, and 14) of the Bloom filter array 401 as pointed to by the cache tag x. Later, when a data access request is received, the test function test(x) is called to read the entries pointed to by the cache tag x from the Bloom filter array 401 and test whether the Bloom filter array 401 contains the cache tag x. A second cache tag y may be input into the entries (bits 2, 4, and 11) of the Bloom filter array 401 as pointed to by the cache tag y using the hash function insert, and the presence of cache tag y may be tested using the function test(y).

In the present example, the cache tags x and y are shown as inputs to the Bloom filter array 401. Each entry of the Bloom filter 401 can be either 0 or 1. The insert function can be based on one or more hash functions, each of which can take a cache tag as an input. The output of the insert function is the bit numbers corresponding to the entries pointed to in the Bloom filter array 401. It is noted that the present disclosure is not limited by a particular hash function, and the number of hash functions being used. For example, an insert function may update four entries of the Bloom filter array when receiving a cache tag as an input.

Note that tags Z and W have not been specifically input into the Bloom filter 401. When a data request with cache tag z is received, the test function test(z) for tag Z is called, and comes back as negative, correctly indicating that Z is not contained in the Bloom filter (and hence not in the DRAM cache). However, when a data access request with a cache tag w is received, the test function test(w) is called to read entries of the Bloom filter array 401 as pointed to by the cache tag w and test the presence or absence of the cache tag w in the Bloom filter array 401. In the present example, the test function test(w) indicates that the cache tag w is present in the Bloom filter array 401. Thus, In the present example, the test function test(w) is an example of a false positive. Therefore, a Bloom filter can be used to identify with certainty cache tags that are not in the cache, but cannot be used to accurately predict what cache tags are in the cache.

According to one embodiment, the present Bloom filter can delete a selected portion or the entire portion of the Bloom filter array. For example, the delete function may be applied at the discretion of the cache controller to wipe out a portion of the Bloom filer array or the entire the Bloom filter array. The delete function may be useful when a cache line in the DRAM cache no longer exists or is evicted due to a cache line replacement. In this case, the delete function can wipe out the corresponding entries in the present Bloom filter array. In cases where the Bloom filter array is not large enough, the cache controller can delete a portion of the Bloom filter array to make room for the new entries. In an alternative embodiment, the present Bloom filter may use a large Bloom filter array to be able to cover an entire tag range, or the cache controller can reset the Bloom filter when the Bloom filter is full so that no more arrays can be added when the Bloom filter becomes inefficient.

Figure 5:
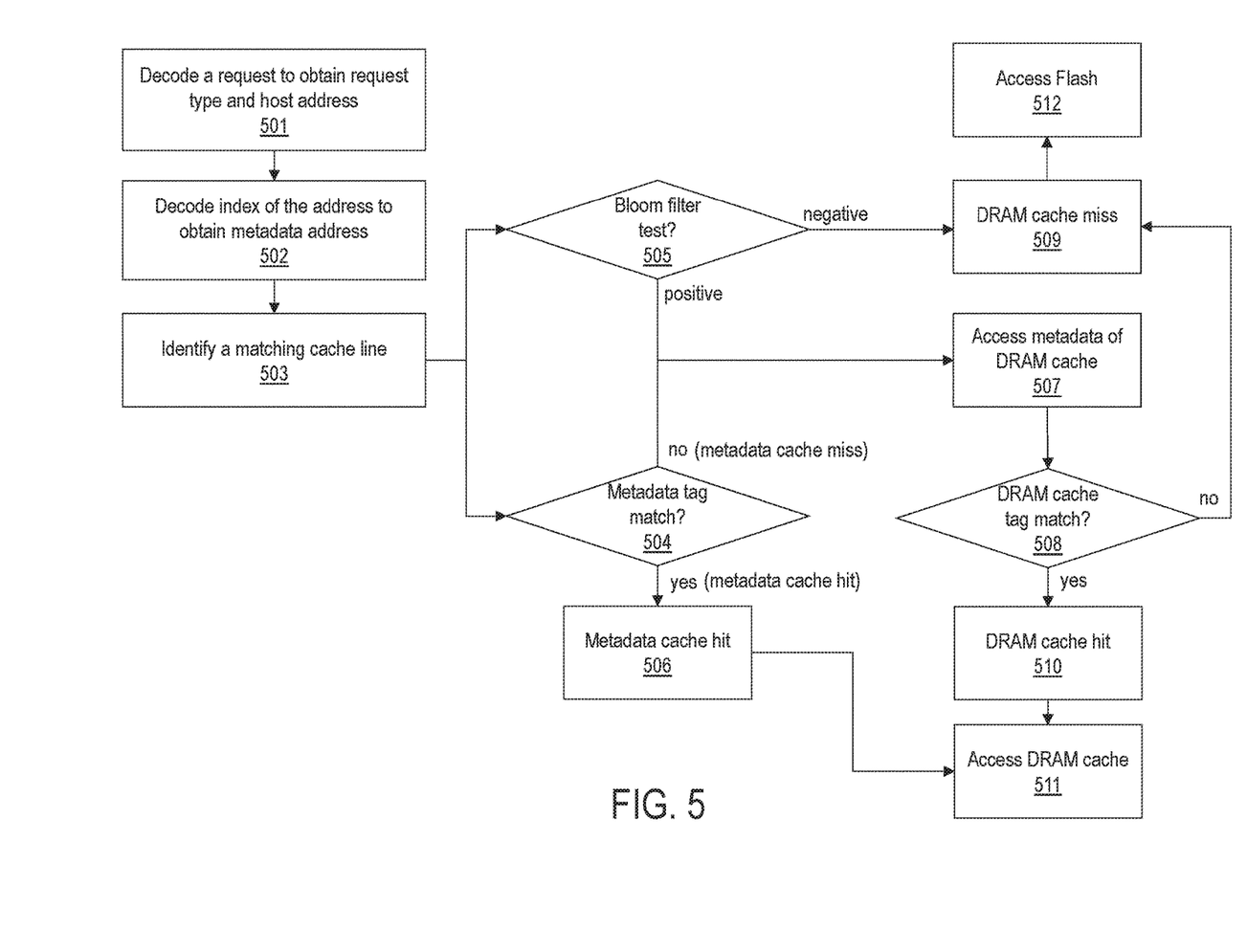
FIG. 5 is a flowchart for performing a data request by a cache controller, according to one embodiment.

FIG. 5 is a flowchart for performing a data request by a cache controller, according to one embodiment. In response to a request for a data access from a host computer, the cache controller of a hybrid memory module decodes the request to obtain a request type (e.g., read, write) and a host address for the requested data (at 501). The host address may include a tag (DRAM cache tag), an index, and an offset. The cache controller then decodes the index of the host address to obtain a metadata address including an MDC tag and an MDC index (at 502). The cache controller uses the MDC index of the metadata address to identify a matching cache line from a metadata cache stored in an SRAM of the hybrid memory module (at 503). The matching cache line stores a pair of an MDC tag and a DRAM cache tag. If there is no matching cache line in the metadata cache, the cache controller requests the DRAM controller to access the metadata included in the DRAM cache and determine if a cached copy of the requested data is present in the DRAM cache (i.e., a true DRAM cache hit or miss).

On the other hand, if a matching cache line is identified in the SRAM metadata cache, the cache controller determines if the MDC tag of the matching cache line matches with the MDC tag of the metadata address, and further determines if the host tag referenced by the matching MDC tag matches with the original host tag (at 504). If the host tag matches (i.e., a metadata cache hit 506), the cache controller determines that the requested data is cached in the DRAM cache and requests the DRAM controller to access the DRAM cache and obtain the requested data from the DRAM cache (at 511) using the matching host tag, skipping access to the metadata included in the DRAM cache.

In addition, the cache controller performs a Bloom filter test using the DRAM cache tag of the matching cache line (or the DRAM cache tag of the host address) to determine a DRAM cache hit or miss (at 505). If the test result of the Bloom filter is negative, the cache controller concludes that the requested data is not cached in the DRAM cache (i.e., a DRAM cache miss) (at 509) and requests the flash controller to access the flash memory, at 512, and obtain the requested data. In this case, access to the metadata included in the DRAM cache can be skipped, and the latency of the data access to the flash memory is improved.

If there is no match for the metadata cache (i.e., a metadata cache miss) and the Bloom filter test result is positive (can be a false positive of a DRAM cache hit), the cache controller requests the DRAM controller to access the metadata included in the DRAM cache (at 507) to determine if the tag (DRAM cache tag) of the host address matches an entry in the metadata included in the DRAM cache (at 508). If the DRAM cache tag matches, the cache controller determines that the requested data is cached in the DRAM cache (i.e., a DRAM cache hit) (at 510) and requests the DRAM controller to access the requested data in the DRAM cache (at 511). If the DRAM cache tag fails to match, the cache controller determines that the requested data is not cached in the DRAM cache (i.e., a DRAM cache miss) (at 509) and requests the flash controller to access the requested data in the flash memory cache (at 512).

The present cache controller can be programmed to support either, both, or none of the metadata cache and the Bloom filter. For example, the cache controller monitors a cache hit ratio to determine disabling/enabling of the metadata cache and/or the Bloom filter. If the metadata cache hit ratio is higher than a first predetermined threshold, the cache controller can disable the Bloom filter because the Bloom filter provides little benefit in mitigating the overhead to access the DRAM cache metadata access. In another example, if the metadata cache hit ratio is lower than a second predetermined threshold, the cache controller can disable the metadata cache leaving only the Bloom filter. If the DRAM is not used as a cache for the flash memory, the cache controller can disable both the metadata cache and the Bloom filter.

According to one embodiment, the cache controller can access the Bloom filter and the metadata cache in parallel to obtain a fast comparison result. According to another embodiment, the cache controller can access the Bloom filter and the metadata cache serially in a low power condition. The cache controller can first check the Bloom filter, and if the Bloom filter results in a metadata cache miss, the cache controller does not activate the metadata cache. If the Bloom filter results in a metadata cache hit, the cache controller can activate the metadata cache to check the DRAM cache hit or miss. If the Bloom filter results in a metadata cache hit but the metadata cache returns false, the cache controller accesses the DRAM cache tag. The order of the serial access may be reversed, that is, accessing in the order of the metadata cache, the Bloom filter, and the DRAM cache tag.

According to one embodiment, a method includes: providing a hybrid memory module including a dynamic random-access memory (DRAM) cache, a flash memory, and a static random-access memory (SRAM) for storing a metadata cache, wherein the DRAM cache includes a cached copy of data stored in the flash memory and metadata corresponding to the cached copy of data, and wherein the metadata cache includes a cached copy of a portion of the metadata included in the DRAM cache; receiving from a host computer a data access request for a data stored in the hybrid memory module; obtaining a host address by decoding the data access request, wherein the host address includes a DRAM cache tag and a DRAM cache index; obtaining a metadata address from the DRAM cache index, wherein the metadata address includes a metadata cache tag and a metadata cache index; determining a metadata cache hit based on a presence of a matching metadata cache entry in the metadata cache stored in the SRAM, wherein the matching metadata cache entry has a pair of a metadata cache tag and a DRAM cache tag; in a case of a metadata cache hit, obtaining the cached copy of data included in the DRAM cache and skipping access to the metadata included in the DRAM cache; and returning the data obtained from the DRAM cache to the host computer.

The determining of the metadata cache hit may further include: comparing the metadata cache tag of the metadata address against the metadata cache tag of one or more metadata cache entries to determine the presence of the matching metadata cache entry in the metadata cache.

The SRAM may further store a Bloom filter, and the method may further include: determining a metadata cache miss based on an absence of a matching metadata cache entry in the metadata cache stored in the SRAM; performing a Bloom filter test with the Bloom filter; determining a DRAM cache miss or a potential DRAM cache hit based on a result of the Bloom filter test; in a case of a DRAM cache miss, obtaining the data stored in the flash memory; and returning the data obtained from the flash memory to the host computer.

The comparison of the metadata cache tag and the Bloom filter test may be performed concurrently.

The method may further include: in a case of the metadata cache miss and the potential DRAM cache hit, accessing the metadata of the DRAM cache; determining whether the data is stored in the DRAM cache based on the comparison of the DRAM tag of the host address against the metadata of the DRAM cache; in a case where a matching entry of the DRAM tag of the host address is present in the metadata of the DRAM cache, obtaining the data from the DRAM cache and returning the data obtained from the DRAM cache to the host computer; and in a case where a matching entry of the DRAM tag of the host address is absent in the metadata of the DRAM cache, obtaining the data from the flash memory and returning the data obtained from the flash memory to the host computer.

The Bloom filter may include a Bloom filter array having a plurality of entries, and the Bloom filter test may provide a positive result or a negative result by applying a hash function to the Bloom filter array.

The method may further include deleting the Bloom filter array or resetting the Bloom filter array.

The method may further include programming the cache controller to disable the Bloom filter when a metadata cache hit ratio is higher than a threshold.

The method may further include programming the cache controller to disable the metadata cache when a metadata cache hit ratio is lower than a threshold.

The method may further include serially accessing the Bloom filter and the metadata cache in a low power condition.

According to another embodiment, a hybrid memory module includes: a flash memory; a dynamic random-access memory (DRAM) cache, wherein the DRAM cache includes a cached copy of data stored in the flash memory and metadata corresponding to the cached copy of data; a static random-access memory (SRAM) for storing a metadata cache including a cached copy of a portion of the metadata included in the DRAM cache; a memory interface for providing an interface to a host computer; a memory access controller for accessing data stored in the DRAM cache and the flash memory; a DRAM controller for controlling access to the DRAM cache; a flash controller for controlling access to the flash memory; and a cache controller for determining a presence of a cached copy of a requested data from the host computer.

The cache controller is configured to: obtain a host address by decoding the data access request, wherein the host address includes a DRAM cache tag and a DRAM cache index; obtain a metadata address from the DRAM cache index, wherein the metadata address includes a metadata cache tag and a metadata cache index; determine a metadata cache hit based on a presence of a matching metadata cache entry in the metadata cache stored in the SRAM, wherein the matching metadata cache entry has a pair of a metadata cache tag and a DRAM cache tag; and in a case of a metadata cache hit, instruct the DRAM controller to obtain the cached copy of data included in the DRAM cache, skipping access to metadata included in the DRAM cache. The memory access controller is configured to return the data obtained from the DRAM cache to the host computer.

The cache controller may further be configured to compare the metadata cache tag of the metadata address against the metadata cache tag of one or more metadata cache entries to determine the presence of the matching metadata cache entry in the metadata cache.

The SRAM may further store a Bloom filter, and the cache controller may further be configured to: determine a metadata cache miss based on an absence of a matching metadata cache entry in the metadata cache stored in the SRAM; perform a Bloom filter test with the Bloom filter; determine a DRAM cache miss or a potential DRAM cache hit based on a result of the Bloom filter test; in a case of a DRAM cache miss, obtain the data stored in the flash memory; and instruct the flash controller to obtain the data stored in the flash memory, skipping access to the metadata included in the DRAM cache, and the memory access controller may be configured to return the data obtained from the flash memory to the host computer.

The cache controller may perform the comparison of the metadata cache tag and the Bloom filter test concurrently.

In a case of the metadata cache miss and the potential DRAM cache hit, the DRAM controller may be configured to: access the metadata of the DRAM cache; and determine whether the data is stored in the DRAM cache based on the comparison of the DRAM tag of the host address against the metadata of the DRAM cache. In a case where a matching entry of the DRAM tag of the host address is present in the metadata of the DRAM cache, the DRAM controller is configured to obtain the data from the DRAM cache, and the memory controller is configured to return the data obtained from the DRAM cache to the host computer. In a case where a matching entry of the DRAM tag of the host address is absent in the metadata of the DRAM cache, the flash controller is configured to obtain the data from the flash memory, and the memory controller is configured to return the data obtained from the flash memory to the host computer.

The Bloom filter may include a Bloom filter array having a plurality of entries, and the Bloom filter test may provide a positive result or a negative result by applying a hash function to the Bloom filter array.

The cache controller may be further configured to delete the Bloom filter array or reset the Bloom filter array.

The cache controller may be programmable to disable the Bloom filter when a metadata cache hit ratio is higher than a threshold.

The cache controller may be programmable to disable the metadata cache when a metadata cache hit ratio is lower than a threshold.

The cache controller may be configured to serially access the Bloom filter and the metadata cache in a low power condition.

The above example embodiments have been described hereinabove to illustrate various embodiments of a system and method for mitigating an overhead for accessing metadata for a DRAM cache in a hybrid memory module using an SRAM metadata cache and a Bloom filter. Various modifications and departures from the disclosed example embodiments will occur to those having ordinary skill in the art. The subject matter that is intended to be within the scope of the invention is set forth in the following claims.

What is claimed is:

1. A method comprising:
providing a hybrid memory module including a dynamic random-access memory (DRAM) cache, a flash memory, and a static random-access memory (SRAM) for storing a Bloom filter and a metadata cache, wherein the DRAM cache includes a cached copy of a plurality of data stored in the flash memory and metadata corresponding to the cached copy of the plurality of data, and wherein the metadata cache includes a cached copy of a portion of the metadata included in the DRAM cache;
receiving from a host computer a data access request for a data stored in the hybrid memory module;
obtaining a host address by decoding the data access request, wherein the host address includes a DRAM cache tag and a DRAM cache index;
obtaining a metadata address from the DRAM cache index, wherein the metadata address includes a metadata cache tag and a metadata cache index;
determining a metadata cache hit based on a presence of a matching metadata cache entry in the metadata cache stored in the SRAM, wherein the matching metadata cache entry has a pair of a metadata cache tag and a DRAM cache tag;
obtaining data from the cached copy of data included in the DRAM cache based on a metadata cache hit using the DRAM cache tag of the matching metadata cache entry and skipping access to the metadata included in the DRAM cache;
returning the cached copy of data obtained from the DRAM cache to the host computer;
determining a metadata cache miss based on an absence of a matching metadata cache entry in the metadata cache stored in the SRAM; and
performing a Bloom filter test with the Bloom filter based on a metadata cache miss and determining a DRAM cache miss or a potential DRAM cache hit based on a result of the Bloom filter test.

2. The method of claim 1, wherein determining the metadata cache hit further comprises:
comparing the metadata cache tag of the metadata address against the metadata cache tag of one or more metadata cache entries to determine the presence of the matching metadata cache entry in the metadata cache.

3. The method of claim 2, further comprising:
obtaining data from the plurality of data stored in the flash memory based on a DRAM cache miss and skipping access to the metadata included in the DRAM cache; and
returning the data obtained from the flash memory to the host computer.

4. The method of claim 1, wherein a comparison of the metadata cache tags and the Bloom filter test are performed concurrently.

5. The method of claim 1, further comprising:
accessing the metadata included in the DRAM cache based on a metadata cache miss and a potential DRAM cache hit;
determining whether data is stored in the DRAM cache based on a comparison of DRAM cache tag of the host address against a metadata included in the DRAM cache;
in a case where a matching entry of the DRAM cache tag of the host address is present in the metadata included in the DRAM cache, obtaining the cached copy of data included in the DRAM cache and returning the cached copy of data obtained from the DRAM cache to the host computer; and
in a case where a matching entry of the DRAM cache tag of the host address is absent in the metadata included in the DRAM cache, obtaining data from the flash memory and returning the data obtained from the flash memory to the host computer.

6. The method of claim 1, wherein the Bloom filter includes a Bloom filter array having a plurality of entries, and the Bloom filter test provides a positive result or a negative result by applying a hash function to the Bloom filter array.

7. The method of claim 6, further comprising deleting the Bloom filter array or resetting the Bloom filter array.

8. The method of claim 1, further comprising programming a cache controller of the hybrid memory module to disable the Bloom filter when a metadata cache hit ratio is higher than a threshold.

9. The method of claim 1, wherein the hybrid memory module includes a cache controller, and the method further comprises programming the cache controller to disable the metadata cache when a metadata cache hit ratio is lower than a threshold.

10. The method of claim 1, further comprising serially accessing the Bloom filter and the metadata cache in a low power condition.

11. A hybrid memory module comprising:
a flash memory;
a dynamic random-access memory (DRAM) cache, wherein the DRAM cache includes a cached copy of a plurality of data stored in the flash memory and metadata corresponding to the cached copy of the plurality of data;
a static random-access memory (SRAM) for storing a Bloom filter and a metadata cache that includes a cached copy of a portion of the metadata included in the DRAM cache;
a memory interface for providing an interface to a host computer;
a memory access controller for accessing the cached copy included in the DRAM cache and the plurality of data stored in the flash memory;
a DRAM controller for controlling access to the DRAM cache;
a flash controller for controlling access to the flash memory; and
a cache controller for determining a presence of cache data in the DRAM cache that corresponds to data requested in a data access request that is received from the host computer,
wherein the cache controller is configured to:
obtain a host address by decoding the data access request received from the host computer via the memory interface, wherein the host address includes a DRAM cache tag and a DRAM cache index;
obtain a metadata address from the DRAM cache index, wherein the metadata address includes a metadata cache tag and a metadata cache index;
determine a metadata cache hit based on a presence of a matching metadata cache entry in the metadata cache stored in the SRAM, wherein the matching metadata cache entry has a pair of a metadata cache tag and a DRAM cache tag; and
instruct the DRAM controller to obtain data from the cached copy included in the DRAM cache based on a metadata cache hit using the DRAM cache tag of the matching metadata cache entry, skipping access to the metadata included in the DRAM cache, and wherein the memory access controller is configured to return the cached copy of data obtained from the DRAM cache to the host computer, wherein the cache controller is further configured to:

determine a metadata cache miss based on an absence of a matching metadata cache entry in the metadata cache stored in the SRAM;

perform a Bloom filter test with the Bloom filter; and determine a DRAM cache miss or a potential DRAM cache hit based on a result of the Bloom filter test.

12. The hybrid memory module of claim 11, wherein the cache controller is further configured to compare the metadata cache tag of the metadata address against the metadata cache tag of one or more metadata cache entries to determine the presence of the matching metadata cache entry in the metadata cache.

13. The hybrid memory module of claim 12, wherein the cache controller is further configured to:

instruct the flash controller to obtain data from the plurality of data stored in the flash memory based on a DRAM cache miss, skipping access to the metadata included in the DRAM cache, and wherein the memory access controller is configured to return the data obtained from the flash memory to the host computer.

14. The hybrid memory module of claim 11, wherein the cache controller performs a comparison of the metadata cache tags and the Bloom filter test concurrently.

15. The hybrid memory module of claim 11, wherein, based on a metadata cache miss and a potential DRAM cache hit, the DRAM controller is configured to:

access the metadata included in the DRAM cache; and determine whether data is stored in the DRAM cache based on a comparison of the DRAM cache tag of the host address against the metadata included in the DRAM cache;

wherein, in a case where a matching entry of the DRAM cache tag of the host address is present in the metadata included in the DRAM cache, the DRAM controller is configured to obtain the cached copy of data included in the DRAM cache, and the memory controller is configured to return the cached copy of data obtained from the DRAM cache to the host computer; and wherein, in a case where a matching entry of the DRAM cache tag of the host address is absent in the metadata included in the DRAM cache, the flash controller is configured to obtain data from the flash memory, and the memory controller is configured to return the data obtained from the flash memory to the host computer.

16. The hybrid memory module of claim 11, wherein the Bloom filter includes a Bloom filter array having a plurality of entries, and the Bloom filter test provides a positive result or a negative result by applying a hash function to the Bloom filter array.

17. The hybrid memory module of claim 16, wherein the cache controller is further configured to delete the Bloom filter array or reset the Bloom filter array.

18. The hybrid memory module of claim 11, wherein the cache controller is programmable to disable the Bloom filter when a metadata cache hit ratio is higher than a threshold.

19. The hybrid memory module of claim 11, wherein the cache controller is programmable to disable the metadata cache when a metadata cache hit ratio is lower than a threshold.

20. The hybrid memory module of claim 11, wherein the cache controller is configured to serially access the Bloom filter and the metadata cache in a low power condition.

* * * * *